Patented Nov. 17, 1953

2,659,738

UNITED STATES PATENT OFFICE 2,659,738

1-NITROANTHRAQUINONE- 3 - CARBOXYLIC ACID AND A PROCESS OF PRODUCING IT

Otto Schlichting, Ludwigshafen (Rhine), Erich Jutz, Schifferstadt, and Werner Rohland, Ludwigshafen (Rhine-Oppau), Germany, assignors to Badische Anilin- & Soda-Fabrik Aktiengesellschaft, Ludwigshafen am Rhine, Germany No Drawing. Application February 19, 1951, Serial No. 211,812

Claims priority, application Germany February 28, 1950

1 Claim. (Cl. 260—376)

This invention relates to 1-nitroanthraquinone-3-carboxylic acid and a process of producing it.

We have found that the hitherto unknown 1-nitroanthraquinone-3-carboxylic acid can be prepared in a simple manner by diazotizing 1-amino-4-nitroanthraquinone - 2 - carboxylic acid and treating the resulting diazo compound with reducing agents which effect the replacement of diazonium groups by hydrogen atoms.

The diazotization of the 1-amino-4-nitroanthraquinone-2-carboxylic acid is effected in the usual manner, for example in concentrated sulfuric acid solution with sodium nitrite or nitrous gases. In order to complete the diazotization, it is preferable to add some ice to the mixture after the introduction of the sodium nitrite. Care should be taken by cooling that the temperature does not rise appreciably above 30° C. The reduction of the diazo compound thus obtained is carried out in the usual manner, for example with cuprous oxide in aqueous alcoholic solution at ordinary temperature. The diazo compound may also be reduced for example by heating it in alcohol and treating it with alkaline stannite solution or with formaldehyde or paraformaldehyde in about 50 to 60% sulfuric acid solution.

The hitherto unknown 1-nitroanthraquinone-3-carboxylic acid is obtained in very good yields by the said method. It may serve as an initial material for the preparation of dyestuffs and intermediates and in particular for the preparation of 1-aminoanthraquinone-3-carboxylic acid.

The following examples will further illustrate this invention but the invention is not restricted to these examples. The parts are by weight.

Example 1

27 parts of 1-amino-4-nitroanthraquinone-2-carboxylic acid are dissolved in 140 parts of concentrated sulfuric acid. 12 parts of crystalline sodium nitrite are gradually added to the solution at about 20° to 30° C. 20 parts of ice are then introduced in small portions, the temperature not being allowed to exceed 30° C. The diazotization mixture is stirred at 20° to 30° C. for 2 to 3 hours. It is then poured onto ice and the yellow diazo compound thus precipitated is filtered well by suction.

The still moist diazo compound is stirred into 100 parts of 50 per cent aqueous solution of ethyl alcohol and, while cooling to about 15° to 30° C., a suspension of cuprous oxide in water is added in portions, a turbulent evolution of nitrogen thus taking place. (The cuprous oxide paste is prepared by treating an aqueous solution of copper sulfate and sodium chloride with sulfur dioxide and then precipitating with soda.) The paste is added until the evolution of nitrogen ceases, about 5 parts of moist paste (corresponding to about 2 parts of dry cuprous oxide) being necessary for the purpose.

When the splitting off of the diazonium group has been completed, the reaction product is filtered off by suction, washed with water and the residue treated with very dilute nitric acid in order to remove the copper. The product is then again filtered by suction, washed until neutral and dried. 21 parts of 1-nitroanthraquinone-3-carboxylic acid are obtained as a yellowish crystal powder. By recrystallization from glacial acetic acid or nitrobenzene, orange-yellow prismatic needles having a melting point of 288° C. are obtained.

The 1-nitroanthraquinone-3-carboxylic acid is soluble in concentrated sulfuric acid to give a yellow coloration. It also dissolves fairly readily in alcohol to give a yellow coloration; it is very difficultly soluble in benzene or toluene upon heating and in solvents of high boiling point, such as nitrobenzene or trichlorbenzene; it is readily soluble upon heating but difficultly soluble in the cold.

Example 2

7 parts of sodium nitrite are dissolved at 70° C. in 300 parts of concentrated sulfuric acid and the solution is cooled to 10° to 20° C. 32 parts of 1-amino-4-nitroanthraquinone - 2 - carboxylic acid are then introduced while stirring at the same temperature. As soon as it has all been dissolved, the solution is diluted to 50 to 60% by the addition of ice, the whole being cooled, if necessary, to ensure that the temperature does not rise above 30° C. After stirring for about an hour, 7 parts of paraformaldehyde are introduced in small portions, whereby a vigorous evolution of nitrogen commences already at 30° to 35° C.; as soon as this has subsided, the mixture is gradually heated to 90° C. in order to complete the reaction.

After cooling, the reaction product is filtered off by suction, washed with cold water and dried. 30 parts of crude 1-nitroanthraquinone-3-carboxylic acid having a melting point of 266° to 272° C. are obtained which can be purified as described in Example 1 by recrystallization or by way of its sulfate.

What we claim is:

A process for the production of 1-nitroanthraquinone-3-carboxylic acid which comprises diazotizing 1 - amino-4-nitroanthraquinone-2-carboxylic acid and treating the diazo compound obtained with reducing agents which effect a replacement of the diazonium group by hydrogen.

OTTO SCHLICHTING.
ERICH JUTZ.
WERNER ROHLAND.

References Cited in the file of this patent

UNITED STATES PATENTS

| Number | Name | Date |
|---|---|---|
| 2,499,003 | Scalera | Feb. 28, 1950 |

OTHER REFERENCES

Saunders: The Aromatic Diazo-Compounds and Their Technical Applications, 2nd Ed., 1949, pages 268–270.

Barnett: Anthracene and Anthraquinone, page 165 (1921).